United States Patent [19]

Konotchick

[11] Patent Number: 5,212,488
[45] Date of Patent: May 18, 1993

[54] ELLIPSOIDAL CHAFF

[76] Inventor: John A. Konotchick, 3116 Mercer La., San Diego, Calif. 92122

[21] Appl. No.: 822,644

[22] Filed: Jan. 21, 1992

[51] Int. Cl.$^5$ .......................... G01S 7/38; H01K 17/00
[52] U.S. Cl. ........................................... 342/12; 342/1
[58] Field of Search ................................ 342/1–3, 342/12; 250/526; 359/350, 515

[56] References Cited

U.S. PATENT DOCUMENTS

| | | | |
|---|---|---|---|
| 3,721,982 | 3/1973 | Wesch | 342/1 |
| 3,841,219 | 10/1974 | Schillreff | 342/12 X |
| 3,992,628 | 11/1976 | Karney | 342/1 X |
| 4,100,102 | 7/1978 | Shaffer | 342/12 X |
| 4,167,009 | 9/1979 | Schwartz | 342/12 |
| 4,173,018 | 10/1979 | Dawson et al. | 342/1 |
| 4,549,489 | 10/1985 | Billard et al. | 342/12 X |
| 4,600,642 | 7/1986 | Lodge et al. | 342/12 |

Primary Examiner—T. H. Tubbesing
Attorney, Agent, or Firm—John R. Ross

[57] ABSTRACT

The present invention provides reflecting chaff microellipsoids having a surface of electrically conducting material. A preferred embodiment consists of $SiO_2$ (95%), $Na_2O$ (1%), $B_2O_3$ (4%) microspheres coated with silver. The present invention is best suited for reflecting electromagnetic radiation within the range of about 100 GHz to 100,000 GHz.

21 Claims, 8 Drawing Sheets

ELLIPSOIDAL CHAFF

This invention relates to chaff and in particular to high frequency radar reflecting chaff.

BACKGROUND OF THE INVENTION

Since World War II, chaff deployment has been one of the most cost-effective electronic countermeasures (ECM) to provide self-protection of tactical aircraft from radar directed weapons. Chaff is relatively inexpensive, and yet has almost universal effectiveness against radars of all types. Conventional chaff basically consists of thin wires or foil strips cut to a length of one-half wavelength (actually, slightly less than that length is optimum) of the radar. That basic design has changed little in the almost half century since its introduction. Radar electronic counter-countermeasures (ECCM) designers have labored to use some means to discriminate the chaff from the aircraft returns. There has been, however, no particular technique which completely negates the effect of chaff, though some techniques can reduce the effects.

Some ECCM designers noted early that chaff fell with a primarily horizontal orientation. Vertically polarized radars would be less effected. The chaff designers, then started to weight some of the chaff dipoles to create a more uniform distribution of polarization returns. When ECCM designers tried to use the half-wavelength resonance of chaff to reduce its effectiveness by deploying frequency agile radars, the chaff designers used a mix of different length chaff to create a broad band of frequency screening. To provide greater shielding capability, chaff designers also improved the cross section per unit volume capability by using thinner chaff dipoles, e.g., coated glass strands. When ECCM designers tried to use the deployment time of the chaff cloud to discriminate it from the aircraft, the chaff designers came up with rapid blooming chaff. Over the years, chaff designers have continued to experiment with a variety of enhancements to chaff. Odd shaped chaff which spins when deployed, creates enhanced doppler returns to help defeat moving target discriminators. Various shapes, coatings (to reduce a tendency of the chaff dipoles to clump together in a "birdnest", and improve blooming), deployments (explosive dispersion, slip-stream dispersion, rocket fired dispersion, etc.), and packagings have been used to extend the effectiveness of this ECM technique.

Radars have also advanced, and one advancement has been to extend radar operation to higher frequencies. Chaff can now be made into very small lengths of very thin strands. These changes extend the utility of standard chaff through the microwave bands, and into the millimeter band. At some point, however, as frequencies are increased, this form of chaff will produce diminishing returns. This thin-wire chaff remains a resonant dipole, which has a peaked response at only one frequency, and some return at multiples of it. It also suffers from loss due to random orientation of the dipoles. Most importantly, dipole chaff in the millimeter region is, because of physical configuration, capable of less effect with increasing frequencies.

Decreasing effectiveness occurs because chaff strands are already being made as thin as possible, even in the microwave band. Because thickness does not significantly improve chaff performance (as long as sufficient conductive volume in the coating is present), the thinnest chaff possible produces the greatest equivalent radar cross section (RCS) for a given volume of chaff package. At some point, however, the coated glass fibers will reach some practical minimum thickness. When this point is reached, the effectiveness of the chaff will degrade with increasing frequency.

An individual average (i.e., average over all possible orientations) chaff dipole has a return roughly equal to $\rho_1 = 0.15\lambda^2$, where $\lambda$ is the wavelength. The equivalent radar cross section of a chaff package is equal to a constant times the cross section of one dipole, times the number of dipoles in the chaff package (i.e., $\rho = C_1\rho_1 n$, where $C_1$ is a constant and n is the number of dipoles. If thickness of the dipoles does not change with increasing frequency, the number of dipoles in a given chaff package volume will increase as a function of $1/\lambda$ (i.e., $n = C_2/\lambda$, where $C_2$ is some constant). The net result will be the total radar cross section of the chaff package volume will be a function of $\lambda$ (i.e., $\rho = C\rho_1 n = C_1\lambda^2 C_2/\lambda = C\lambda$, where C is a constant), or the reciprocal of frequency.

As long as the chaff dipoles can continue to be made proportionately thinner as they are shorter (with increasing frequency), it is possible to gain increasing cross section/package as a function of frequency. Once a point of minimum practical thickness has been reached, however, the equivalent cross section/package decreases with frequency.

Figure 1A:
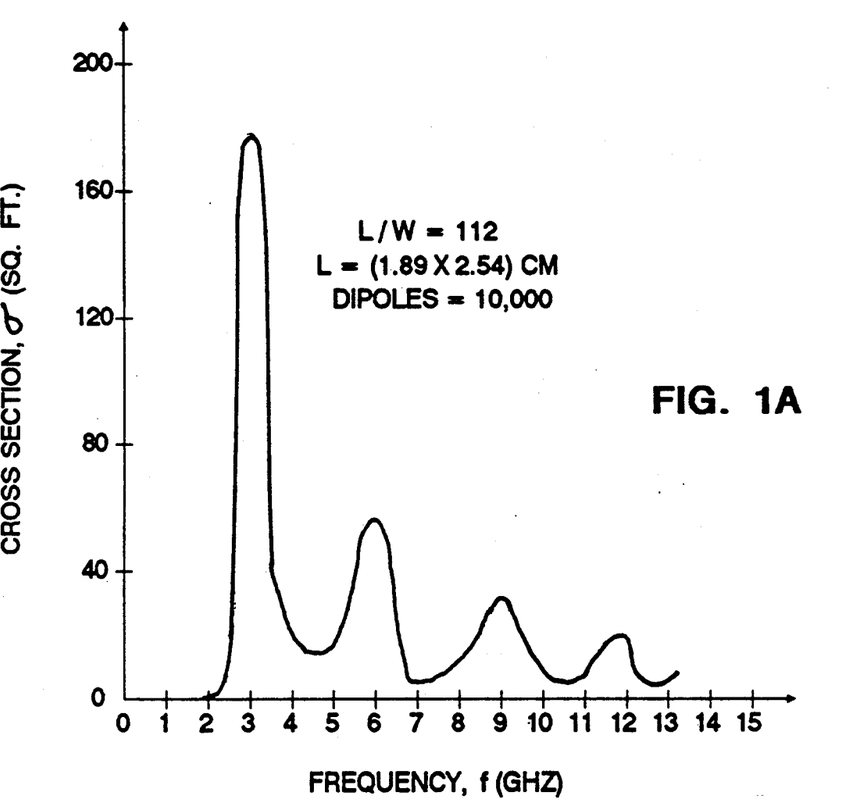
FIG. 1A is a graph showing radar cross section vs. frequency for dipole chaff in the low GHz. range.
Figure 1B:
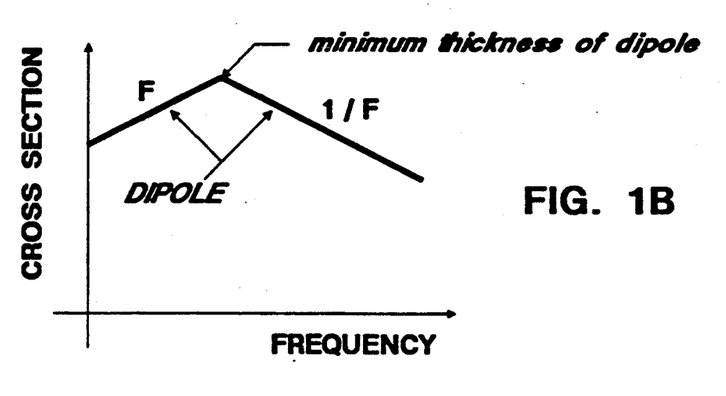
FIG. 1B is a graph showing radar cross section vs. frequency for dipole chaff at high frequencies.

Current chaff dipoles are reaching a limit of effectiveness in the millimeter band. They have two deficiencies, illustrated by FIGS. 1A and 1B, that will not be deficiencies in the chaff proposed herein. FIG. 1A illustrates the return of a typical chaff dipole with a length-to-width ratio of 112. This would correspond to a dipole of 25 micron thickness that was cut for resonance at about 55 GHz (i.e., about 0.56 cm long). It shows how the RCS decreases sharply after resonance. The bandwidth for this low length-to-width ratio is about 25%. At typical length-to-width ratios of 1,000 or 10,000 the bandwidth would only be about 15% and 10% respectively. To cover a broad range of frequencies a variety of dipole lengths would have to be included in the chaff package volume. This dilutes the effective RCS of a chaff package at any given frequency. FIG. 1B illustrates the RCS which can be packed into a given volume chaff package verses frequency (assuming that minimum practical thinness has been reached). The breakpoint in FIG. 1B occurs when the minimum practical thickness has been reached. The entire curve, however, would also have to be shifted downward if a broadband of frequencies needed to be covered with a single chaff package.

Chaff is also used as a research tool for tracing air motion in the atmosphere. Aircraft seed the atmosphere with radar reflecting chaff so that radars can obtain measurement data on wind direction and speed. Ideally such chaff should be highly radar reflective, have good volume-to-cross section ratio, have low fall rates, and be environmentally benign. Modern aluminized glass fiber chaff possesses most of these qualities, but would have greater utility for tracing atmospheric air motion if it had a lower fall rate.

Aluminized glass fiber chaff is touted to have a fall rate of 0.3 meters/second. This is at sea level; it has a higher fall rate at upper altitudes. Measured data, moreover, often shows faster fall rates on this chaff. The new chaff described herein can be made with fall rates less than 1/10 that of conventional chaff.

Because chaff dipoles, at resonance, have almost the same radar cross section (RCS) regardless of their thickness, they are made as thin as possible. Making the dipole chaff as thin as possible also makes the fall rate as low as possible. This makes the chaff less broadband, but that is not usually an issue for this application. Current aluminized glass fiber chaff has a thickness of about 25 microns. At this thickness, many dipoles can be packed into a small volume at microwave frequencies and lower. To make the chaff thinner yet, would result in reduced conductive volume, and increased breakage of the dipoles. In effect, current dipole chaff has reached limits in its ability to be effective at very high frequencies, and also in its fall rate.

SUMMARY OF THE INVENTION

The present invention provides reflecting chaff microellipsoids having a surface of electrically conducting material. A preferred embodiment consists of $S_iO_2$ (95%), $Na_2O$ (1%), $B_2O_3$ (4%) microspheres coated with silver. The present invention is best suited for reflecting electromagnetic radiation within the range of about 100 GHz to 100,000 GHz.

DETAILED DESCRIPTION OF PREFERRED EMBODIMENTS MICROELLIPSOIDS

A new form of chaff is proposed, which is easy to manufacture, is broad-band, and is effective throughout the millimeter band and above. It could be a perfect compliment to conventional chaff, becoming increasingly effective at frequencies where conventional chaff is becoming increasingly ineffective.

The chaff of the present invention is comprised of conductive microellipsoids or in a preferred embodiment as the special ellipsoidal shape of microspheres, instead of the typical thin-dipole shape. A non-spherical ellipsoidal embodiment would have some orientation dependance and could have advantages in producing doppler modulation on the radar return as it tumbled. The spherical shape is not orientation dependent. The radar location, or polarization would have no discrimination due to orientation. This chaff will also not suffer a significant cross section reduction above its resonant frequency. This means that it will continue to screen at the design frequency and frequencies above its resonant frequency. For deployment, the microspheres might be filled with a ga that is lighter than air to make the chaff almost neutrally buoyant in air. It should be noted, however, that the fall rates for this spherical chaff should be very low even with conventional manufacturing. The spheres could also be easily dispensed through accurate metering into airframe slipstreams.

Figure 2:
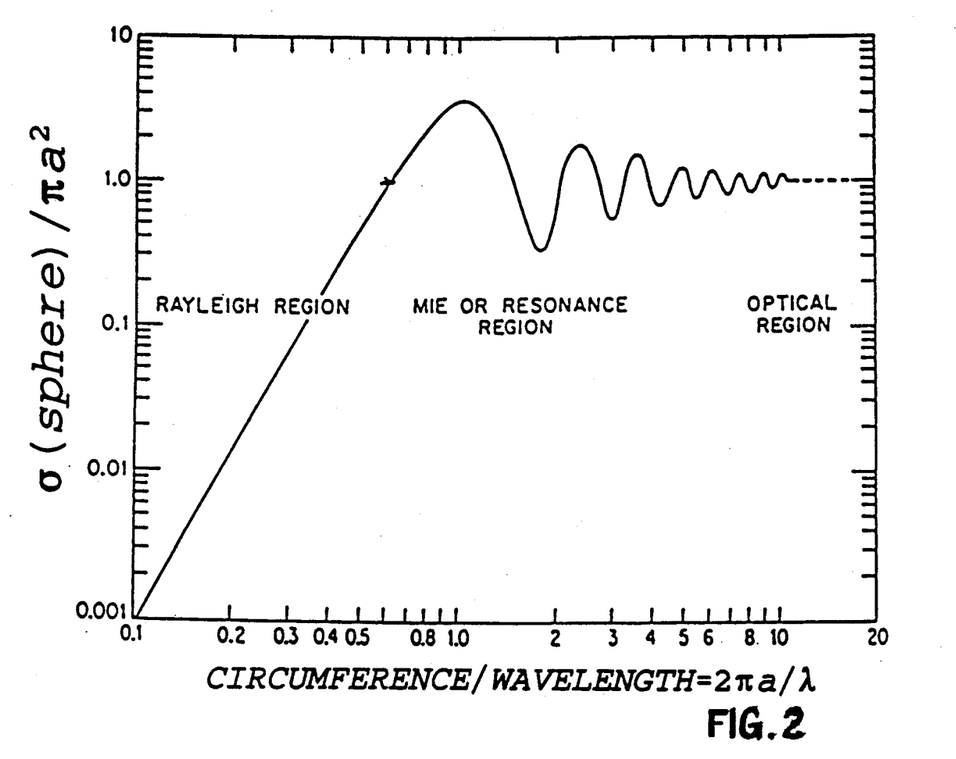
FIG. 2 is a graph showing the relationship between radar cross section, the size of microspheres, and wavelength for spherical chaff.

FIG. 2 (taken from Merrill Skolnik's RADAR HANDBOOK), illustrates the RCS of a conductive sphere. Unlike FIG. 1A, the RCS does not significantly diminish after resonance. Although, its peak resonance occurs when its circumference is approximately one wavelength, it gives a return of approximately $\rho a^2$ (i.e., geometric cross sectional area) for a $\geq \lambda/10$, where a is the sphere's radius. Since the RCS for a resonant sphere varies as $\lambda^2$, and the number of spheres in a given volume will vary as $1/\lambda^3$, the total RCS in a given volume will vary as $1/\lambda$, i.e., it will increase directly with frequency. Commercially available microspheres are available down to the micron level, so that this increasing RCS with frequency should remain true several decades above the millimeter wave band.

For lower frequencies, dipoles have an admitted advantage. For example, at a wavelength of 1 cm. (i.e., 30 GHz), the resonant dipole length will be slightly less than 0.5 cm., and will have a cross section of approximately $1.5 \times (10^{-5})$ m$^2$. The sphere will have a resonant diameter of about 0.318 cm., and a cross section of approximately $2.8 \times (10^{-5})$ m$^2$. The resonant sphere diameter is only slightly less than the resonant dipole length, and produces only slightly more cross section than the resonant dipole. At the lower end of the millimeter band, many more dipoles could be packaged into a given volume than the much thicker spheres. The chaff package for spheres would, therefore, not have a RCS as large as for dipoles. At higher frequencies, however, equivalent radar cross sections which can be put into a given volume package become increasingly large and practical. Such chaff can provide an option for extending chaff useful ranges, from the point that dipoles are no longer practical, up several orders of magnitude higher.

Figure 3:
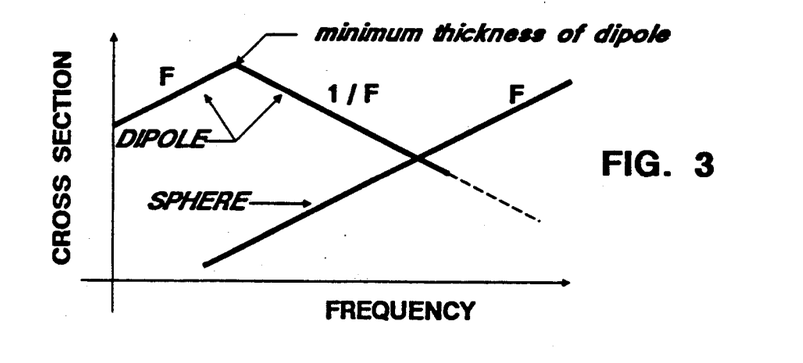
FIG. 3 is a graph generally comparing the effectiveness of dipole chaff to spherical chaff at high frequencies.

FIG. 3 illustrates the RCS trends for both conventional chaff and this new spherical (or slightly ellipsoidal) chaff for high (millimeter and above) frequencies. The scales are not indicated because the exact crossover points are, as yet, undefined.

In some sense the chaff dipoles can be thought of as evolving smoothly into ellipsoidal or spherical chaff as the frequency is raised. That is, as the dipole length-to-width ratio becomes smaller, the return becomes more broadband and larger. It also begins to approach the ellipsoid both in appearance and RCS return. If, for example, we consider spherical chaff with minimum dipole diameter and length of 25 microns this frequency would be at about 3800 GHz. In a practical sense, however, the ellipsoidal chaff should become more effective long before this point, because of its superior physical properties, and the difficulty of manufacturing and deploying dipole chaff in millimeter wave sizes. The curves will depend upon the particular chaff dipoles used, and the ellipsoid characteristics.

The microspheres substrate material can be solid or hollow, conductive or non-conductive. One embodiment uses hollow glass spheres with a wall thickness of 1-2 microns, which are commercially available from a variety of sources (e.g., Grace Syntactics, Inc.). These spheres have an advantage of uniformity, of being environmentally benign, and being very lightweight (less than 0.25 g/cc.). They are, however, non-conductive and must therefore be coated with conductive material.

Figure 9:
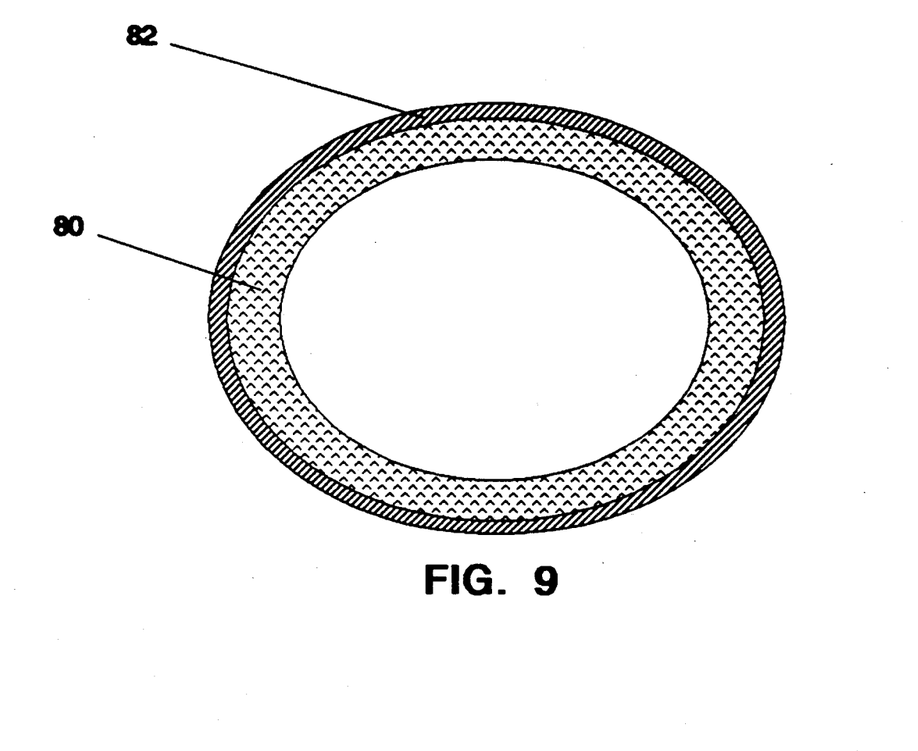
FIGS. 9 and 10 are drawings of microspheres.

FIG. 9 shows a cross section view of a coated hollow glass microellipsoid showing the glass 80 and the metallic coating 82.

Figure 10:
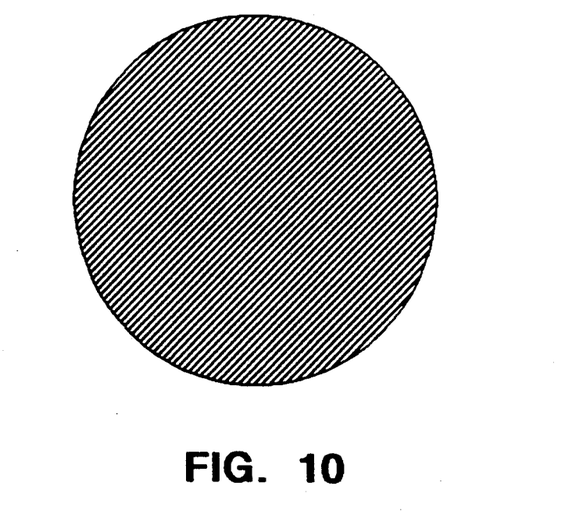

FIG. 10 shows a cross section view of a solid metallic microsphere.

COATINGS

Figure 4A:
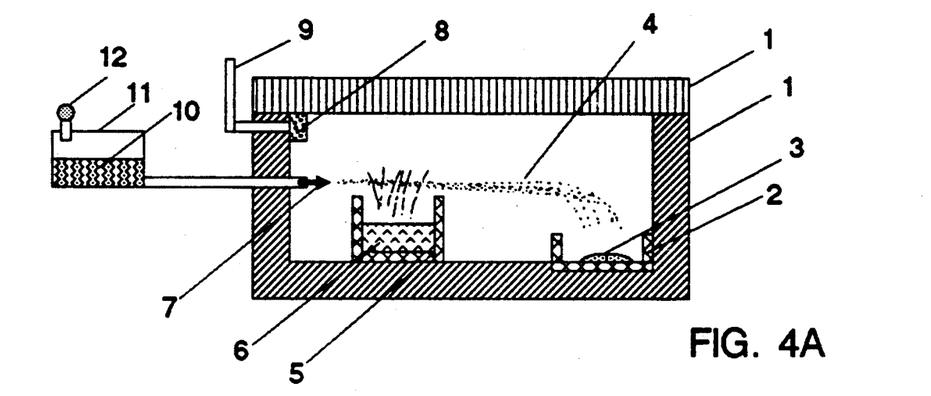
FIG. 4A is a diagram of a process for applying a conductive coating to microellipsoids using vapor deposition.

The chemical content of one preferred microsphere is $SiO_2$ (95%), $Na_2O$ (1%), and $B_2O_3$ (4%). This microsphere is marketed by the Grace Syntactics Corp. This material will not reflect radar; the microspheres must therefore be coated with a radar reflecting material such as silver metal. The coating is preferably less than 1 micron in thickness. The coatings are preferably applied using one of the following techniques:

vapor deposition: One way to apply conductive coatings is to use vapor deposition, as shown in FIG. 4A. A vacuum pump is connected to tube 9 to pull gas through filter 8 to create a vacuum 4 inside chamber 1. A heater 5 turns the metal used for coating 6 into boiling temperatures. This for a particular metal would be at a temperature less than the boiling point of the metal at standard atmospheric pressure (i.e., less than 2467° C. for Aluminum, 2212° C. for Silver, etc.). A metering valve 12 is used to permit small amounts of gas into vacuum chamber 11 containing glass microellipsoids 10. This forces the microellipsoids through a nozzle 7 which directs them through the metallic vapor. The microellipsoids are coated with metal and fall in a cloud 4 into a collecting container 2 to be accumulated as conductive microellipsoids 3.

Figure 4B:
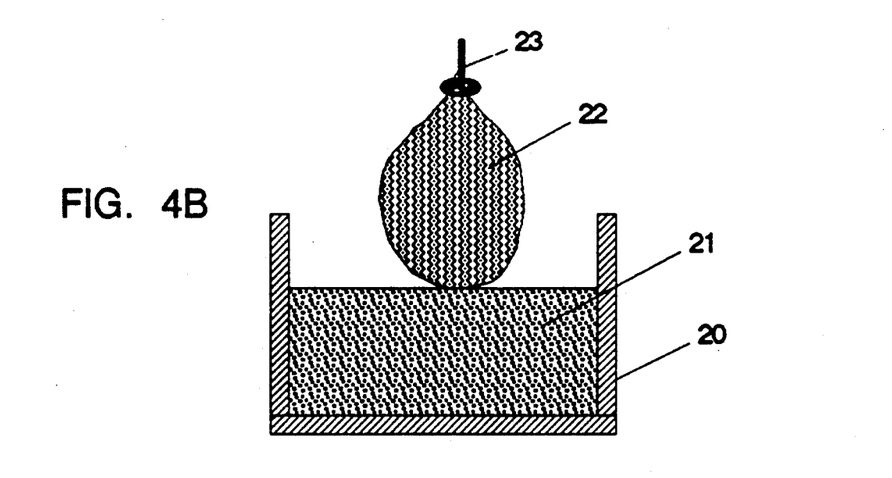
FIG. 4B is a diagram of a process for applying a conductive coating to microellipsoids using a conductive bath.

Virtually any metallic coating can be uniformly applied in this way. Using this process, the conductive metal to be used for coating is vaporized using heat and vacuum, and the microspheres are passed through this environment. This permits the microspheres to pick-up a coating thickness dependent upon the time they are exposed to this environment. Vapor deposition can provide an excellent coating of thin (e.g., 1 micron layer), uniform conductor to the hollow, glass microspheres.

liquid deposition: As shown in FIG. 4B, a liquid deposition process can be used for applying conductive surfaces. The container 20 contains a conductive material 21 for example, metallic paint. The microellipsoids can be put in a bag 22 and raised and lowered into the liquid, 21, by a cable 23. The mixture should be kept moving until it dries to prevent the spheres from coalescing into a solid clump as they dry.

Figure 4C:
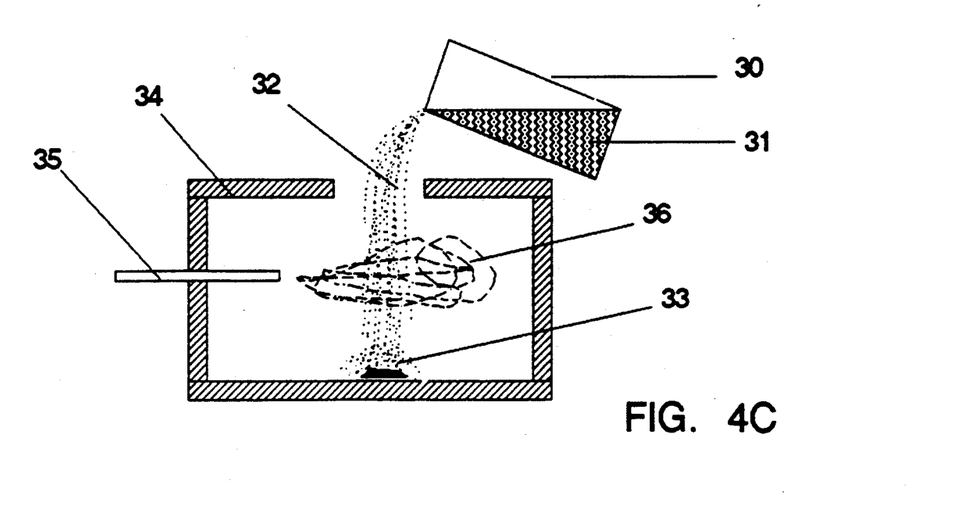
FIG. 4C is a diagram of a process for applying a conductive coating to microellipsoids using a spray of conductive material.

Using this method the microspheres are passed through a liquid conductor, which adheres to the surface. This method is less expensive, but also less uniform (producing slightly ellipsoidal shapes).

spray deposition: Using the process of spray deposition, as shown in FIG. 4C, the microspheres are passed through a spray of conductive material, picking up a partial coating as they go. This is a simple and effective technique, but gives very non-uniform coatings, leading to ellipsoidal shapes). A container 30 containing non-conductive microellipsoids 31 dispenses a cloud of the microellipsoids 32 into a spray chamber 34 A spray tube 35 is used to create a spray of conductive material (e.g., metallic paint 36 into the chamber 34. The resultant coated microellipsoids fall to the bottom of the chamber 34 where they are collected in a pile 33.

CONDUCTIVE MICROELLIPSOIDS

Figure 5:
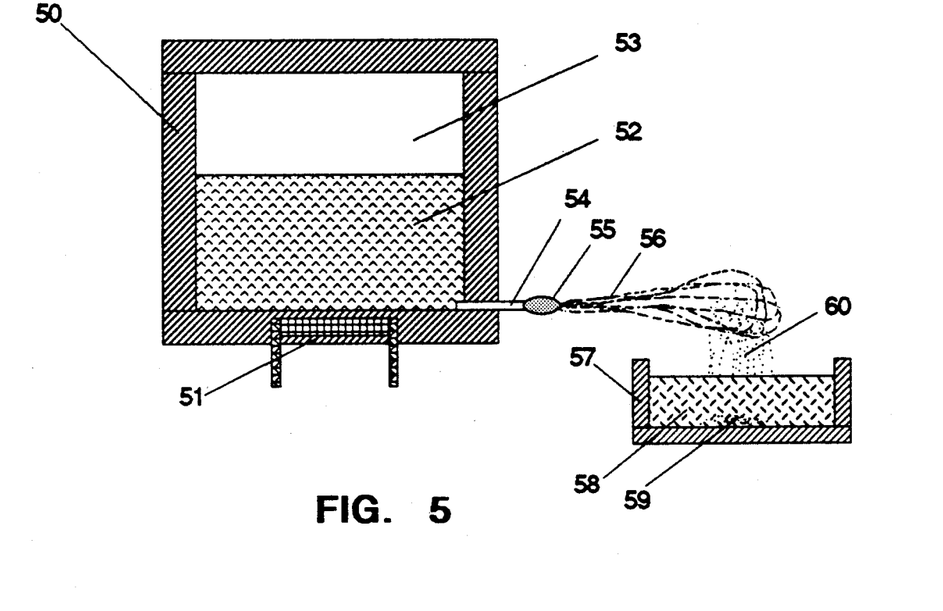
FIG. 5 is a diagram of a process for producing solid metallic microellipsoids.

If the microellipsoids (microspheres) are conductive to begin with (e.g., most metallic materials) no coating is necessary. Such metallic ellipsoids (spheres) can be manufactured by spraying liquid metal under high pressure as shown in FIG. 5. A sealed container 50 uses a heater 51 to melt the metal 52. The area 53 above the molten metal 53 can be additionally pressurized, if required, to force the molten metal 52 under high pressure through tube 54 and nozzle 55. The metal exits nozzle 55 and is atomized 56. These atomized molten metal globs assume an ellipsoidal shape as they fall 60 into a cooling bath 57 containing water 58 or other coolant. The solid metal microellipsoids collect in a pile 59 at the bottom.

The molten metal assumes an approximately spherical (ellipsoidal) shape while still molten, and free falling, and solidifies as it cools, preserving this shape. Although, such spheres are much more dense than the hollow coated spheres described above, their small size (would typically be used in sizes less than 100 micron) will provide the low fall rates desired for chaff The production of ellipsoidal chaff by the means of FIG. 5 could take place on the platform to be protected, for example, onboard the aircraft. The ellipsoidal chaff could also be comprised of a conductive material other than metal, for example a conductive fluid such as sea water.

CHAFF PACKAGING

Figure 6:
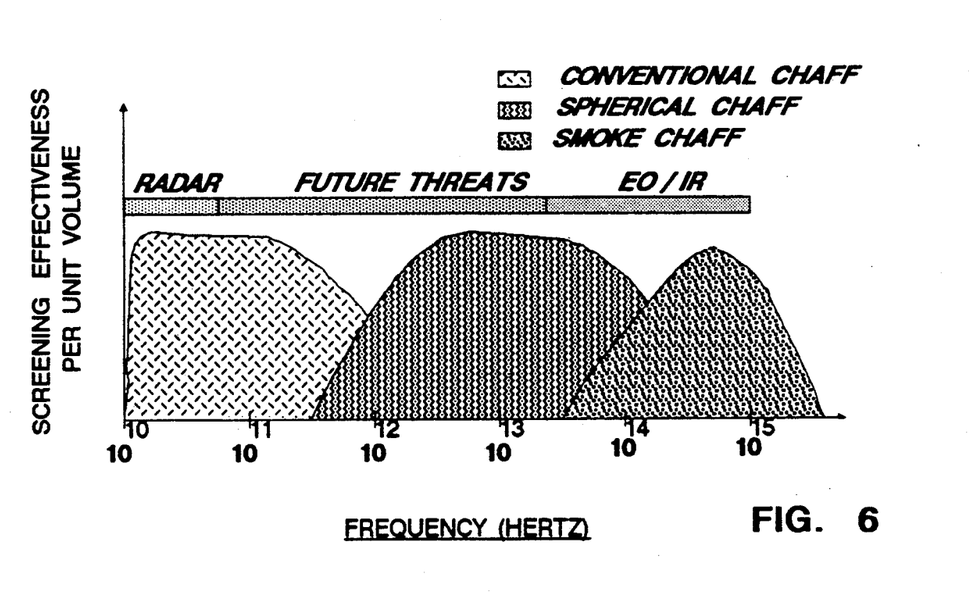
FIG. 6 is a graph showing frequency bands of coverage for various types of chaff material.

Spherical chaff could be used to cover the frequency region from microwaves through to the visible range. At low frequencies, however, the sphere size would be too large to be as efficient as conventional chaff. Similarly, at optical frequencies, the particle size would be so small at resonance that one would have essentially smoke chaff. That is, it would not be necessary to use micron sized metallic or conductive spheres. A preferred packaging, therefore, would use this new chaff form to cover that region that is currently not covered. FIG. 6 illustrates these frequency regions.

Conventional chaff will cover frequencies to about $10^{11}$ Hz. Smoke can be effective above about $10^{14}$ Hz. This new chaff form fills the current void between these two regimes. One preferred packaging to achieve ultra-broadband coverage would use a mixture of conventional and ellipsoidal chaff in a frangible, explosive canister. The explosive mixture chosen for dispersing the chaff would produce smoke chaff as a by-product. Simple black powder, for example.

Particle size plays a major role in screening effectiveness, even in smoke or aerosols. With some reasonable simplifying assumptions it can be shown that a similar curve to FIG. 2 results for smoke comprised of small particles, where the ordinate of FIG. 2 is replaced by the scattering coefficient. The scattering coefficient is a function of the particle size (as well as the dielectric constant of the particle).

The smoke attenuation factor is a more useful measure than RCS in the EO/IR region. The attenuation can be estimated as: $A = e^{-3klm/4ad}$, where "k" is the scattering coefficient, "l" is the path length, "m" is the mass per unit volume of the smoke cloud, "a" is the particle radius, and "d" is the density of the smoke material (particles). For example, with $d = 0.9$ gm/cm$^3$, $m = 4.5 \times 10^{-6}$ gm/cm$^3$, $l = 0.5$ m, $a = 0.65$ micron, and an index of refraction of 1.5, a peak attenuation of $10^5$ occurs at about 1 micron wavelength ($3 \times 10^{14}$ Hz). The variation with frequency can be plotted for various particle sizes, concentrations, and smoke cloud sizes.

The chaff mixture should ideally be matched to the target it is meant to protect. That is, to provide proper screening, the RCS of the chaff package should exceed the RCS of the target at all aspects of the target and at all frequencies between MMW and EO/IR.

CHAFF DEPLOYMENT

Figure 11:
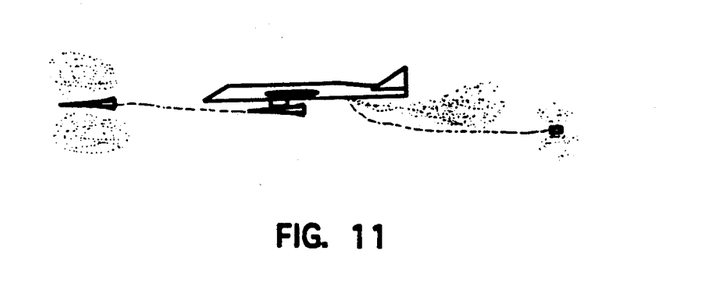
FIG. 11 illustrates three standard chaff dispensing means.
Figure 12:
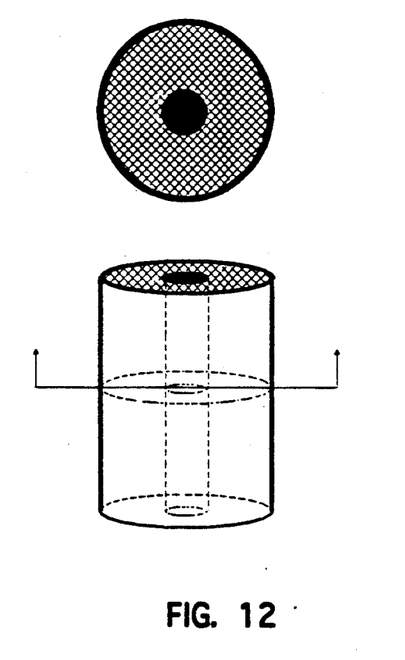
FIG. 12 illustrates a standard single cell explosive chaff canister.

To be effective as chaff, the microellipsoids (microspheres) should be dispersed over wide areas quickly. Many methods for accomplishing this dispersal are known to people skilled in the art of electronic warfare. FIG. 11 illustrates several of these methods. These include, for example, forward-fired chaff rockets, dropping from airplanes, etc. For some applications such chaff could be dispersed into the slipstream of a dispensing airframe. For other applications, rapid blooming chaff would require explosive dispersion. FIG. 12 illustrates a standard explosive canister with the new chaff surrounding the cylindrical explosive, all contained within a frangible canister. As noted under the packaging discussion, this explosive charge could also be used to produce a smoke, which would help to screen in the optical region. The small size of the microspheres creates low fall rates, but also resistance to rapid spreading. To disperse such small powdery material quickly can be done through a series of explosive charges (much like some holiday fireworks). Using this technique the microspheres are dispensed through a primary explosive charge followed by a series of following explosive charges.

Figure 7:
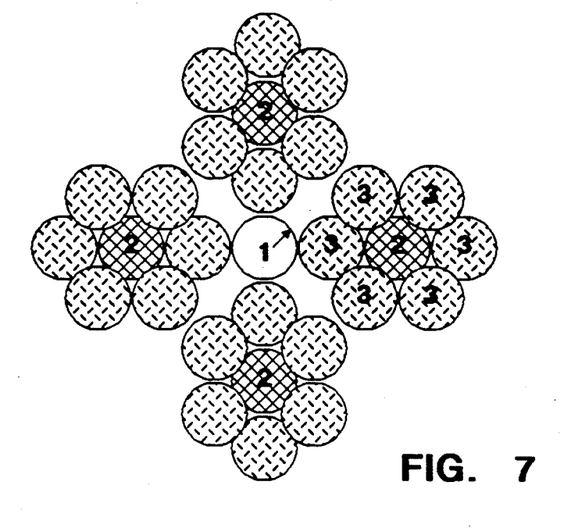
FIG. 7 is a chart indicating a preferred method of dispensing spherical chaff.
Figure 13:
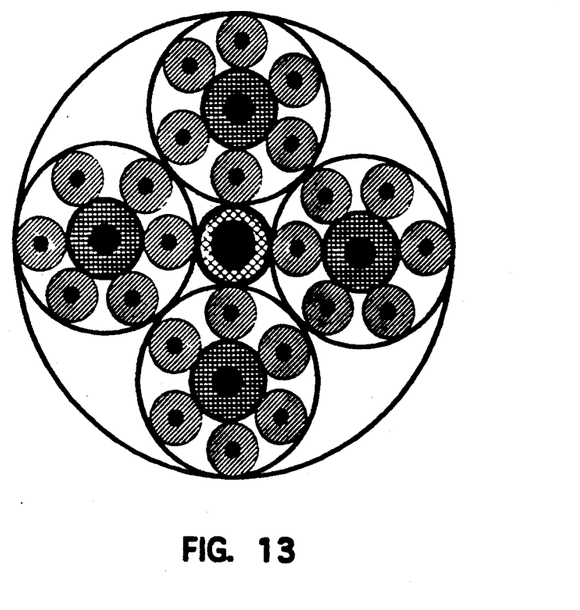
FIG. 13 is a cross section of a multiple burst canister.

FIG. 7 illustrates a typical explosive dispersion embodiment. Each explosive charge can spread the powder to some radius, 1. FIG. 13 illustrates a cross section of such a multiple exploding canister. This radius is in general not large enough for broad-area chaff coverage. The primary explosive therefore also disperses secondary explosive frangible canisters, 2. These secondary canisters dispense tertiary canisters, 3, and so on. The fuze delays of the various canisters are timed to maximize dispersive coverage.

PROTOTYPE EXPERIMENTS

To validate the theoretical analyses, and to reduce to practice a practical embodiment of the ellipsoidal (almost spherical) chaff, several varieties of ellipsoidal chaff have been tested. These tests used inexpensive materials for the chaff, and tested fall rates, and radar reflecting properties. The practical chaff embodiment used in these tests was 30 micron diameter, solid aluminum spheres obtained from METCO (Aluminum powder 54NS).

fall rates - Two groups of spherical materials were tested. One group consisted of large solid spheres. These were: steel shot (12.7 mm dia.), BBs (4.5 mm dia.), and glass marbles (12 mm dia., about the same density as aluminum). This group all had calculated terminal velocities in air of greater than 20 m/sec. The terminal velocities of these spheres were not reached in the short drop heights used (up to 6 meters), but the measured drop times corresponded to predicted times for such fast falling spheres (e.g., 0.78 seconds for a 3 meter drop).

The second group of spherical objects were solid aluminum spheres (30 micron dia) and styrofoam spheres (2-3 mm dia, about 1/100 the density of aluminum, and 100 times larger dia). The predicted terminal velocities of these spheres were less than 1 m/sec. These spheres would reach terminal velocity in the short drop heights.

The average drop times for a 3 meter drop of styrofoam spheres was 2.9 seconds, and for solid aluminum spheres was 6.3 seconds. Even though 100 times more dense, the small size of the microspheres gives them a very low fall rate. The microspheres also dispersed nicely. In very light breeze, they were spread over 2 meters horizontally and 1.5 meters vertically in a 3 meter drop. This dispersion would be enhanced in aircraft seeding, or in turbulent air.

reflectivity - Reflectivity was tested by scaling the effects of the ellipsoidal (spherical) chaff into the microwave region. That is, proportionately larger spheres were used at lower frequencies. Inexpensive transmitters and receivers are not yet available at thousands of GHz to properly test the small microspheres.

Figure 8:
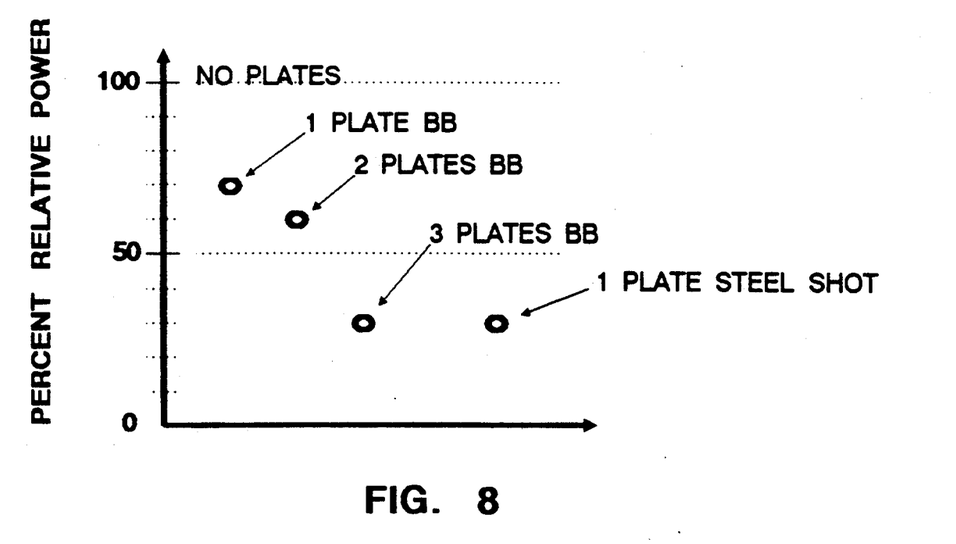
FIG. 8 is a graph of signal strength for two receiver positions and two path conditions tested.

A $K_A$-Band microwave beam $-30$ GHz) was used to transmit a CW signal from a transmitter, through a horn antenna aligned to another horn antenna (approximately 8 feet away), connected to a receiver. The amplitude of this signal path was measured. Plates containing a scattering of conductive spheres were then inserted midway in the path and the amplitude again measured. A scattering of 12.7 mm diameter steel shot (resonant 7.5 GHz), and BBs of 4.5 mm dia (resonant 21 GHz) were glued to non-conductive sheets to make the plates. FIG. 8 illustrates the received signal measured with and without scatter plates in position. It shows that these spherical shapes do indeed screen microwaves as predicted, above their design frequency.

Testing was also performed in which the receive horn antenna was moved from 90 degrees to 170 degrees away from its original position, to see if reflection from the spheres could be detected. In these tests, reflection was indeed detected, but due to the way the plates were constructed, (i.e., all spheres in the plane of the plate) there was an unusually large return from the direction of the angle of reflection for the plate (as the plates were turned). Again, however, the spherical reflection was significantly as predicted for spherical conductors above resonant frequency.

Although, these reflectivity experiments were done at a scaled frequency (i.e., at 30 GHz. instead of thousands of GHz.) the testing illustrates that spherical chaff can be an effective screening agent.

We can conclude from the tests above that solid aluminum spheres of about 30 microns in diameter (an inexpensive powder) would have low fall rates, and would screen effectively all frequencies above about 3000 GHz.

While the above description contains many specificities, the reader should not construe these as limitations, but merely as amplifications of the preferred embodiment thereof. Those skilled in the art will envision many other possible variations within its scope. Accordingly, the reader is requested to determine the scope f the invention by the appended claims and their legal equivalents and not by the examples which have been given.

I claim:

1. Microellipsoidal chaff system for neutralizing radar operating at one or more frequencies within the range of about 100 GHz to 100,000 GHz comprised of:
   a large quantity of electromagnetic energy reflecting microellipsoids each of said microellipsoids being comprised of solid matter and having a major dimension of less than 1 millimeter and greater than 1 micron,
   a microellipsoidal containment and dispersion means for holding said microellipsoids until time for dispersement and for dispersing said microellipsoids into or above the atmosphere.

2. System as in claim 1 wherein said microellipsoids are solid metal ellipsoids.

3. System as in claim 1 wherein said microellipsoids are hollow metal ellipsoids.

4. System as in claim 1 wherein said microellipsoids are hollow ellipsoids of non-conducting material coated with an electrically conducting material.

5. Chaff as in claim 4 wherein said non-conducting material is $S_iO_2$ (95%), $Na_2O$ (1%), $B_2O_3$ (4%) and said conductive material is silver.

6. System as in claim 1 wherein said microellipsoids are solid ellipsoids of non-conducting material coated with an electrically conducting material.

7. System as in claim 1 wherein said large quantity of microellipsoids is packaged with an explosive material to provide an explosive dispersion.

8. Chaff as in claim 7, wherein said explosive material is chosen to produce a by-product of smoke to aid in screening at optical frequencies.

9. Chaff as in claim 8 wherein conventional chaff dipoles are added to produce an ultra-broadband coverage.

10. System as in claim 1 wherein said explosive material is arranged to permit successive explosions to provide for rapid blooming of said chaff.

11. A chaff system as in claim 1 wherein said ellipsoids has a minor dimension as well as a major dimension, said minor dimension generally being greater than one half said major dimension.

12. Chaff as in claims 1, 2, 3, 4, 6, 7, 8, 9 or 5 where said microellipsoids are spherical in shape.

13. Microellipsoidal chaff system for neutralizing radar operating at one or more frequencies within the range of about 100 GHz to 100,000 GHz comprised of:
    a large quantity of electromagnetic energy reflecting microellipsoids each of said microellipsoids being comprised of solid matter and having a major dimension of less than 1 millimeter and greater than 1 micron,
    a microellipsoidal containment and dispersion means for holding said microellipsoids until time for dispersement and for dispersing said microellipsoids into or above the atmosphere.

14. A process for neutralizing radar comprising the step of dispersing into the atmosphere ellipsoidal shaped chaff having a metallic coating and a major dimension of less than 1 millimeter.

15. Method of making a chaff system comprising the steps of:
    producing a large batch of microellipsoids having a major dimension of less than 1 millimeter,
    coating said microellipsoids with a conductive material, and
    installing said coated microellipsoids in a containment and dispersion means for holding said microellipsoids until time for dispersement into or above the atmosphere.

16. Method as in claim 15 wherein said step of coating conductive material is applied by a process of vapor deposition.

17. Method as in claim 15 wherein said conductive material is applied by a process of vapor deposition.

18. Method as in claim 15 wherein said conductive material is applied by liquid bath.

19. Method as in claim 15 wherein said conductive material is applied by liquid bath.

20. Method as in claim 15 wherein said conductive material is applied by spray coating.

21. Method as in claim 15 wherein said conductive material is applied by spray coating.

* * * * *